United States Patent
May-Weymann

(10) Patent No.: US 9,668,284 B2
(45) Date of Patent: May 30, 2017

(54) DYNAMIC PUBLIC WARNING SYSTEM DEACTIVATION

(71) Applicant: NVIDIA Corporation, Santa Clara, CA (US)

(72) Inventor: Alexander May-Weymann, Sophia Antipolis (FR)

(73) Assignee: Nvidia Corporation, Santa Clara, CA (US)

(*) Notice: Subject to any disclaimer, the term of this patent is extended or adjusted under 35 U.S.C. 154(b) by 232 days.

(21) Appl. No.: 13/896,046

(22) Filed: May 16, 2013

(65) Prior Publication Data

US 2014/0342687 A1    Nov. 20, 2014

(51) Int. Cl.
| | |
|---|---|
| *H04W 76/00* | (2009.01) |
| *H04W 4/22* | (2009.01) |
| *H04W 64/00* | (2009.01) |
| *H04W 4/02* | (2009.01) |
| *H04W 4/06* | (2009.01) |

(52) U.S. Cl.
CPC ........... *H04W 76/007* (2013.01); *H04W 4/22* (2013.01); *H04W 64/00* (2013.01); *H04W 4/021* (2013.01); *H04W 4/06* (2013.01)

(58) Field of Classification Search
CPC ......... H04W 4/06; H04W 4/021; H04W 4/22; H04W 8/26; H04W 4/001; H04W 4/027; H04W 4/12; H04W 60/00; H04W 72/005; H04W 76/007; H04W 84/00; H04W 88/06; H04W 88/10; H04H 20/61; H04L 12/189
USPC ......... 455/404.1, 404.2, 432.2; 370/312, 338
See application file for complete search history.

(56) References Cited

U.S. PATENT DOCUMENTS

2013/0083717 A1* 4/2013 Vos .......................... H04W 4/06
                                                          370/312
2014/0179258 A1* 6/2014 Arzelier .................. H04W 4/22
                                                          455/404.1

FOREIGN PATENT DOCUMENTS

WO       2013021232 A1     2/2013

OTHER PUBLICATIONS

Foreign Communication From a Related Counterpart Application, German Application No. 10 2013 014 611.9, German Examination Report dated Jan. 14, 2014, 6 pages.

(Continued)

*Primary Examiner* — Chuong A Ngo
(74) *Attorney, Agent, or Firm* — Kevin Brown; Parker Justiss, P.C.

(57) ABSTRACT

One aspect provides a method of operating a modem at a terminal. The modem is arranged to store one or more message identifier. Each of the one or more message identifier identifies a type of message that the modem is arranged to act upon when received on a broadcast channel from a communications network. The method comprises detecting a country that the terminal is located in. The method further comprises determining if the detected country is a country in which a public warning system is implemented. The method further comprises determining if the one or more message identifier includes only public warning message identifiers. The method further comprises disabling monitoring of the broadcast channel if the detected country is not a country in which a public warning system is implemented and the one or more message identifier includes only public warning message identifiers.

26 Claims, 4 Drawing Sheets

(56) References Cited

OTHER PUBLICATIONS

3GPP GSM; Global System for Mobile Communications; "Digital Cellular Telecommunications System (Phase 2+); Universal Mobile Telecommunications System (UMTS); Public Warning System (PWS) Requirements"; (3GPP TS 22.268 version 11.5.0, Release 11); ETSI TS 122 268; v11.5.0, Jan. 2013, 16 pages.

\* cited by examiner

DYNAMIC PUBLIC WARNING SYSTEM DEACTIVATION

TECHNICAL FIELD

This application is directed, in general, to Public Warning Systems and, more specifically, to dynamically deactivating a Public Warning System message.

BACKGROUND

A device such as a smartphone, tablet or other mobile terminal may support one or more radio access technologies for communicating over a wireless cellular network. For example the device may support one or more of the 2G, 3G and LTE (Long Term Evolution) technologies. A radio access technology (or "RAT") is a manifestation in a device and/or network of a particular set of standardized specifications, comprising standardized protocols for communicating over the network. For example 2G, 3G and LTE technologies are defined in the various releases of the 3GPP (3rd Generation Partnership Project) standard. Each of the radio access technologies can be used for both voice over a dedicated voice channel and data over a general purpose packet-based data channel.

In a 3GPP environment, the radio access technology used by the device at any given time is subject to precise rules specified in the standard.

With the release 8 of the 3GPP specification, a feature called ETWS (Earthquake and Tsunami Warning System) was introduced. With release 9 of the 3GPP specification, a feature called CMAS (Commercial Mobile Alert System) was introduced. With release 10 of the 3GPP specification a feature called EU-Alert is introduced.

All of these three systems are used to inform a user of a device of possible threats like an earthquake that just has happened or an expected tsunami by way of a PWS message. Each of these three systems is commonly referred to as a Public Warning System (PWS). ETWS is the Japanese system, while CMAS is the US system and EU-alert will be the European system.

These three Public Warning Systems are described in more detail in the document "3rd Generation Partnership Project; Technical Specification Group Services and System Aspects; Public Warning System (PWS) requirements" Serial No. 3GPP TS 22.268 specification.

SUMMARY

One aspect provides a method of operating a modem at a terminal. The modem is arranged to store one or more message identifier. Each of the one or more message identifier identifies a type of message that the modem is arranged to act upon when received on a broadcast channel from a communications network. The method comprises detecting a country that the terminal is located in. The method further comprises determining if the detected country is a country in which a public warning system is implemented. The method further comprises determining if the one or more message identifier includes only public warning message identifiers. The method further comprises disabling monitoring of the broadcast channel if the detected country is not a country in which a public warning system is implemented and the one or more message identifier includes only public warning message identifiers.

Another aspect provides a modem for use at a terminal. The modem comprises a first interface, a memory, and a processing unit. The first interface is arranged to connect to a communications network. The memory is arranged to store one or more message identifier. Each of the one or more message identifier identifies a type of message that the modem is arranged to act upon when received on a broadcast channel from the communications network via the first interface. The processing unit is arranged to detect a country that the terminal is located in. The processing unit is also arranged to determine if the detected country is a country in which a public warning system is implemented. The processing unit is also arranged to determine if the one or more message identifier stored in the memory includes only public warning message identifiers. The processing unit also arranged to disable monitoring of the broadcast channel if the detected country is not a country in which a public warning system is implemented and the one or more message identifier includes only public warning message identifiers.

In yet another aspect there is provided a computer program product for operating a modem for use at a terminal. The computer program product comprises code embodied on a non-transitory computer-readable medium. When the computer program product is executed on a processing unit of the modem, it is configured to perform the following steps. First, one or more message identifier is stored. Each of the one or more message identifier identifies a type of message that the modem is arranged to act upon when received on a broadcast channel from a communications network. Next, a country that the terminal is located in is determined. Next, if the detected country is a country in which a public warning system is detected. Next, it is determined if the one or more message identifier includes only public warning message identifiers. Next, monitoring of the broadcast channel is disabled if the detected country is not a country in which a public warning system is implemented and the one or more message identifier includes only public warning message identifiers.

BRIEF DESCRIPTION OF THE DRAWINGS

Reference is now made to the following descriptions taken in conjunction with the accompanying drawings, in which.

DETAILED DESCRIPTION

For computer systems implemented on user devices, such as mobile smart phones and tablets, it is important to keep the power consumption of the computer system at a low level because, for example, the power supply to the user device may be limited. Part of all three of the specifications is that the public warning message will be distributed via a broadcast channel.

A device regularly listens to a broadcast channel in case a public warning message is distributed by the radio access network. The public warning messages are identified by message identifiers. It may not be possible for a user of a device to disable presentation of some or all of the public warning messages (associated with certain message identifiers) subject to regulatory requirements and/or operator policy. For example, a device supporting CMAS (like demanded by all US operators due to US regulations) will always have to consume power listening to the broadcast channel while waiting for the reception of a CMAS message.

Embodiments of the present disclosure enable a device to reduce power consumption (conserve power) when the device is located in a country where a public warning message is not expected by disabling monitoring of the broadcast channel.

Figure 1:
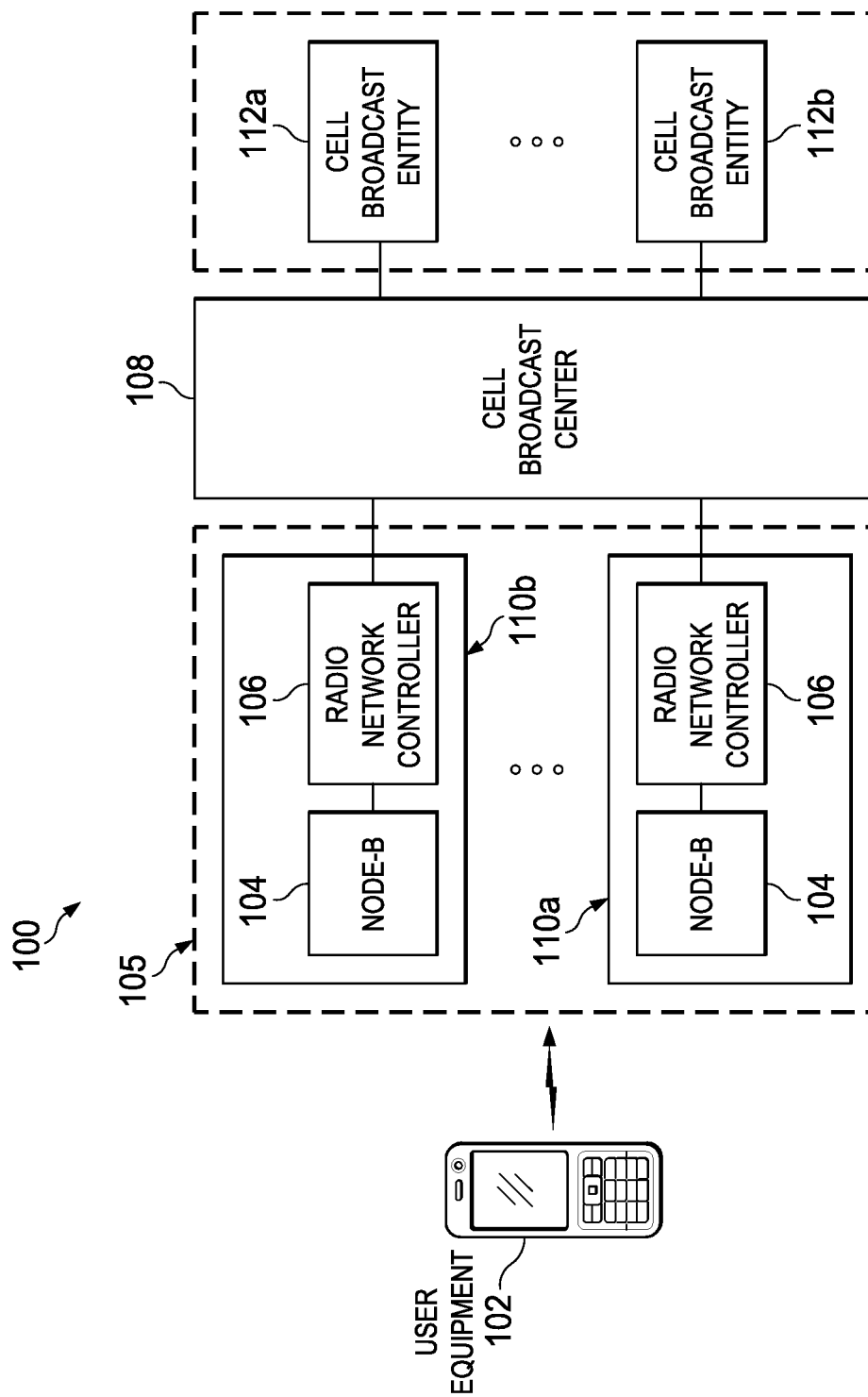
FIG. 1 shows a communication system.

With reference to FIG. 1, there is illustrated the main elements of a communication system, generally denoted by reference numeral 100. It will be understood that in FIG. 1 only sufficient elements of the system are shown in order to present the context of the arrangements of the disclosure.

The communication system 100 comprises a communications device termed user equipment (UE) 102. The UE 102 is in communication with a radio access network 105. The radio access network 105 is in communication with a cell broadcast center (CBC) 108 which is integrated as a node in the core network (CN). The CBC is in communication with one or more cell broadcast entity (CBE) 112. Through a CBE 112, content providers are able to create a PWS message and select the geographical location(s) they require a PWS message to be sent to. The PWS message is then sent to the CBC 108, which sends the PWS message to the required elements of the radio access network 105, which manage the broadcast of the PWS message in the targeted cells.

As a mere example, FIG. 1 shows a UMTS communication system 100 such that the radio access network 105 is a UMTS Terrestrial Radio Access Network (UTRAN).

The UTRAN 105 comprises one or more radio network sub-systems 110a,110b. A radio network sub-system is a sub-network within the UTRAN 105 and comprises a base station 104 (termed node-B) and a radio network controller (RNC) 106. A node-B 104 is a transceiver which sends and receives wireless signals and defines a cell region. A RNC 106 is the network element responsible for the control of the radio resources of the UTRAN 105. A dedicated physical channel is established between the UE 102 and the node-B 104 to allow data communication to take place there between. It will be appreciated that a plurality of UEs and radio network sub-systems may be present in the UTRAN 105, which for clarity purposes is not shown.

Whilst the RNC 106 is shown in FIG. 1 to be in communication with the CBC 108, it will be appreciated that when the radio access network is configured in accordance with other radio access technologies (i.e., GSM, E-UTRAN etc.) an appropriate network element (i.e., a Base Station Controller (BSC) in a GSM network or a Mobile Management Entity (MME) in a E-UTRAN network) will be in communication with the CBC 108, such arrangements being well known to persons skilled in the art and are therefore not discussed in detail herein.

Figure 2A:
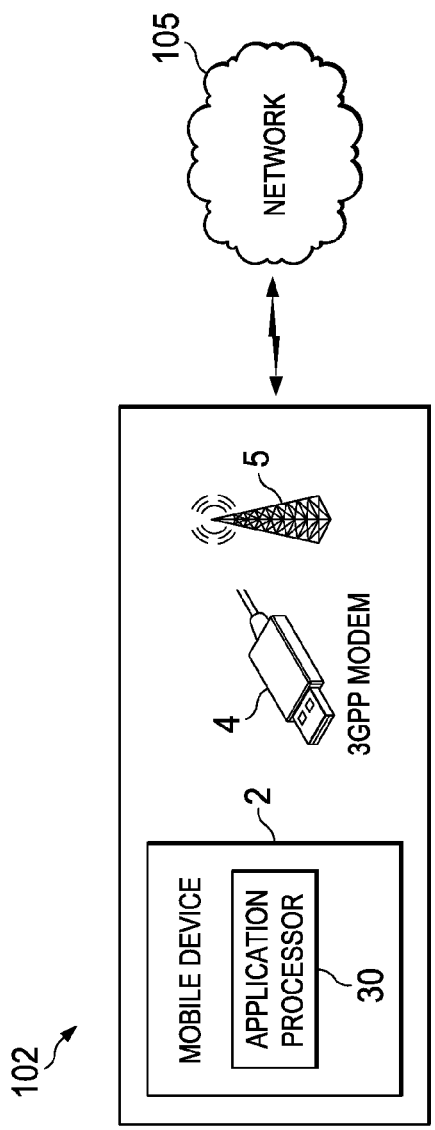
FIGS. 2a and 2b illustrate schematic block diagrams of a user equipment.
Figure 2B:
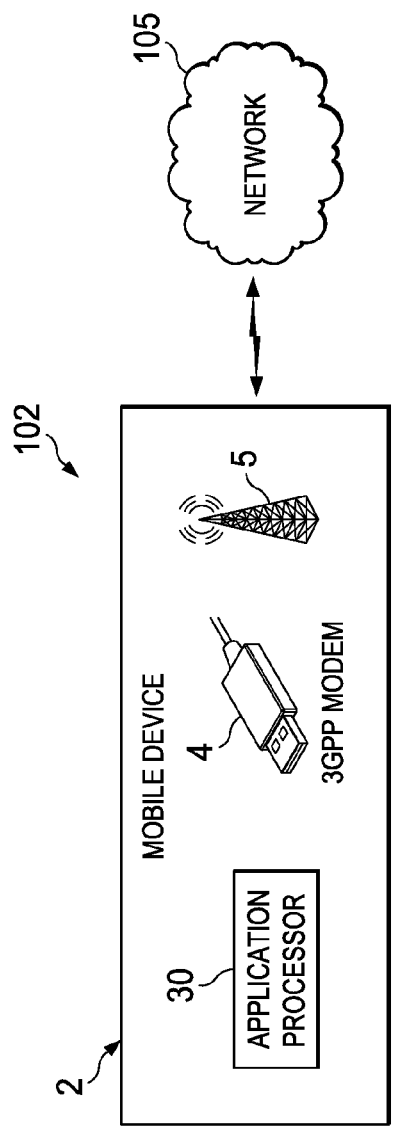

Reference is now made to FIGS. 2a and 2b which illustrate schematic block diagrams of UE 102 comprising a host terminal 2 and a modem 4. The host terminal 2 may be a user terminal, and may for example take the form of a laptop computer, tablet style computer, personal digital assistant (PDA) or mobile phone (which may be referred to as a "smart phone") or any other device that exchanges data wirelessly. As shown in FIG. 2a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 2a, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2). In another alternative set up, as shown in FIG. 2b, the modem 4 may be internal to the host terminal 2, e.g., taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection. The system could also be a single-chip design where the modem 4 and application processor 30 share the same die.

For connecting to the network 105, the modem 4 comprises a first interface.

With reference to the communication system shown in FIG. 2a, the first interface may comprise a wireless transceiver, typically in the form of a radio frequency (RF) transceiver and an antenna 5. The first interface of the modem connects via an antenna (not shown) of the network 105 enabling the modem 4 to establish a channel between itself and the network 105.

With reference to the communication system shown in FIG. 2b, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via an antenna (not shown) of network 105 enabling the modem 4 to establish a channel between itself and the network 105.

This channel referred to above may be referred to as a "context". For example, if the network 105 is a 3GPP network, then the connection between the modem 4 and a 3GPP network 105 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP standard specifications. The network 105 may be coupled to a further, packet-based network, preferably a wide area internetwork such as the Internet, by way of one or more gateway routers.

For connecting to the host processor 30 on the host terminal 2, the modem 4 comprises a second interface.

With reference to the communication system shown in FIG. 2a, the second interface, between the host processor 30 and modem 4, could for example comprise a wired connection such as a serial interface, for example a Universal Serial Bus (USB), or a short-range wireless transceiver such as an infrared connection or a radio frequency connection (e.g. Bluetooth).

With reference to the communication system shown in FIG. 2b, the second interface, between the host processor 30 and modem 4, could for example comprise a wired connection within the host terminal 2.

Figure 3A:
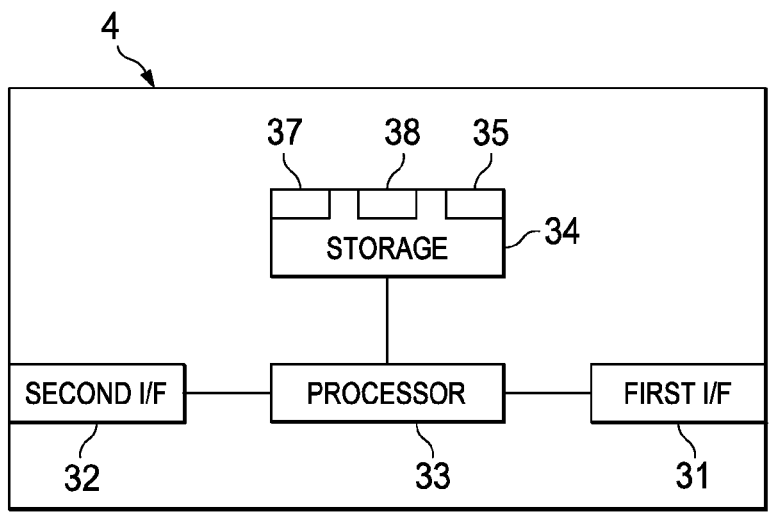
FIG. 3a is a schematic block diagram of a modem for use at a host terminal.

Referring to FIG. 3a, the modem 4 may comprise a processor 33 and, operatively coupled to the processor 33, a non-transitory computer-readable storage medium 34 such as a magnetic or electronic memory storing soft-modem code 35. The code 35 on the storage medium 34 is arranged to be executed on the processor 33, so as when executed to send and receive packets between the host 2 and network 105. However, the possibility of some or all of the modem functionality being implemented in dedicated hardware is not excluded. The modem 4 may be configured with additional functionality added in accordance with the present disclosure, an example of which will be discussed in more detail below.

Figure 3B:
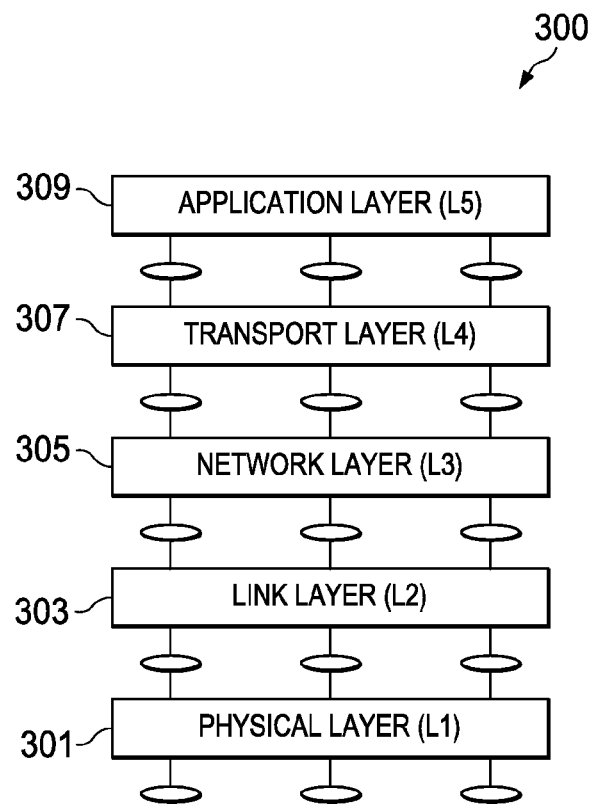
FIG. 3b shows a block diagram of a radio interface protocol architecture.

Referring to FIG. 3b, there is shown a simplified block diagram of a radio interface protocol architecture 300. Communications between the modem 4 and the radio access network 105 are effected in accordance with the multi-layered communications protocol as defined for example by 3GPP for transferring data across a radio channel such as a 2G, 3G or LTE radio channel. The protocol architecture comprises a physical layer (L1) 301, above the first layer is a link layer (L2) 303, above the second layer is a network layer (L3) 305, above the third layer is a transport layer (L4) 307, and above the fourth layer is an application layer (L5) 309. Operations performed at each of these layers are well known to persons skilled in the art and is therefore not discussed in detail herein.

The radio access network 105 is arranged to transmit broadcast messages to the UE 102 via a broadcast channel, i.e., a channel used to transmit broadcast data from the radio access network 105 to the UE 102. The term "broadcast channel" is not used herein to refer to the broadcast channel (BCH) transport channel defined in 3GPP specifications. The broadcast channel may be used to transmit cell broadcast (CB) messages to the UE 102, i.e., a CB channel. The broadcast channel may be termed in dependence on the radio access technology used, for example the broadcast channel may be a Cell Broadcast Channel (CBCH), Forward Access Channel (FACH) or a Downlink Shared Channel (DL-SCH). The types of broadcast channel mentioned herein are merely examples and are not intended to be limiting in anyway. Cell Broadcast is an example broadcast service which is used for sending short text messages to all mobile stations in a defined geographical area. Example CB messages include public warning messages, advertisements, weather reports, breaking news and sports updates.

Referring to UMTS as an example, CB messages (and CB scheduling messages) may be sent from the radio access network 105 to the UE 102 using the CTCH (Common Traffic Channel) logical channel. The MAC layer (of link layer 303) multiplexes the CTCH onto the FACH (Forward Access Channel) transport channel. The FACH transport channel can be mapped onto the S-CCPCH (Secondary Common Control Physical Channel).

Each CB message contains a message identifier which identifies the source and type of the message. In particular, the radio access network 105 is arranged to use a certain range of message identifiers to identify public warning CB messages. The UE 102 is able to attempt to receive CB message(s) whose message identifier(s) match those in a configurable search list stored by the UE. The configurable search list 38 may be stored on a subscriber identity module (SIM) card, universal subscriber identity module (USIM) card, memory 34, or other memory location of the UE 102. In FIG. 3b the configurable search list 38 is shown as stored in memory 34. The configurable search list 38 may not necessarily be stored on the same physical memory device as the rest of the soft modem code 35, though it could be. Various other aspects of the current cell broadcast service (CBS) implementation are discussed in the document "3rd Generation Partnership Project; Technical Specification Group Core Network and Terminals; Technical Realization of Cell Broadcast Service (CBS)" Serial No. 3GPP TS 23.041.

In accordance with embodiments of the present disclosure, the memory 34 may store a list 37 of one or more countries in which a PWS is installed and activated. This PWS country list 37 may not necessarily be stored on the same physical memory device as the rest of the soft modem code 35, though it could be. The countries in which a PWS is installed and activated may be identified by their associated mobile country code (MCC). For reference, the ITU-T Recommendation E.212 defines mobile country codes. The mobile country codes are a three digit number and are used in combination with a mobile network code (MNC) to uniquely identify a network operator. For example the MCC for the United Kingdom is 234/235, the MCC for Japan is 440/441, and the MCC for the USA is 310-316.

The PWS country list 37 is dynamically updatable in that one or more countries (i.e., one or more MCCs) may be added to the PWS country list 37 if PWS support in these one or more countries becomes mandatory, or one or more countries (i.e., one or more MCCs) may be removed from the PWS country list 37 if PWS support in these one or more countries is no longer mandatory. The modem 4 may update the PWS country list 37 in response to receiving data from a network, i.e., the UE's home network or a visited network provided by a foreign operator that the UE 102 moves into. The modem 4 may also update the PWS country list 37 in response to receiving data from the application processor 30 in the form of an AT (ATtention) command. That is, the modem processor 33 may include an AT command interface for receiving AT commands from the host processor 30 on the host terminal 2. The AT command interface may take the form of an application program interface (API). If the modem 4 takes the form of a mobile phone handset which, as well as being a conventional mobile telephone, can be connected to the host terminal 2 (i.e., a personal computer) so as to act as an external cellular modem for the host terminal 2, the PWS country list 37 may be updated by a user of the host terminal 2 via a "connection manager". The connection manager is a program executable on the host terminal 2 which provides a graphical user interface (GUI) and is used to handle the connection to the network 105 which the modem 4 is providing to the host terminal 2. A user of the host terminal 2 can use the connection manager to update the modem 4, and in particular, update the PWS country list 37 stored in memory 34.

Figure 4:
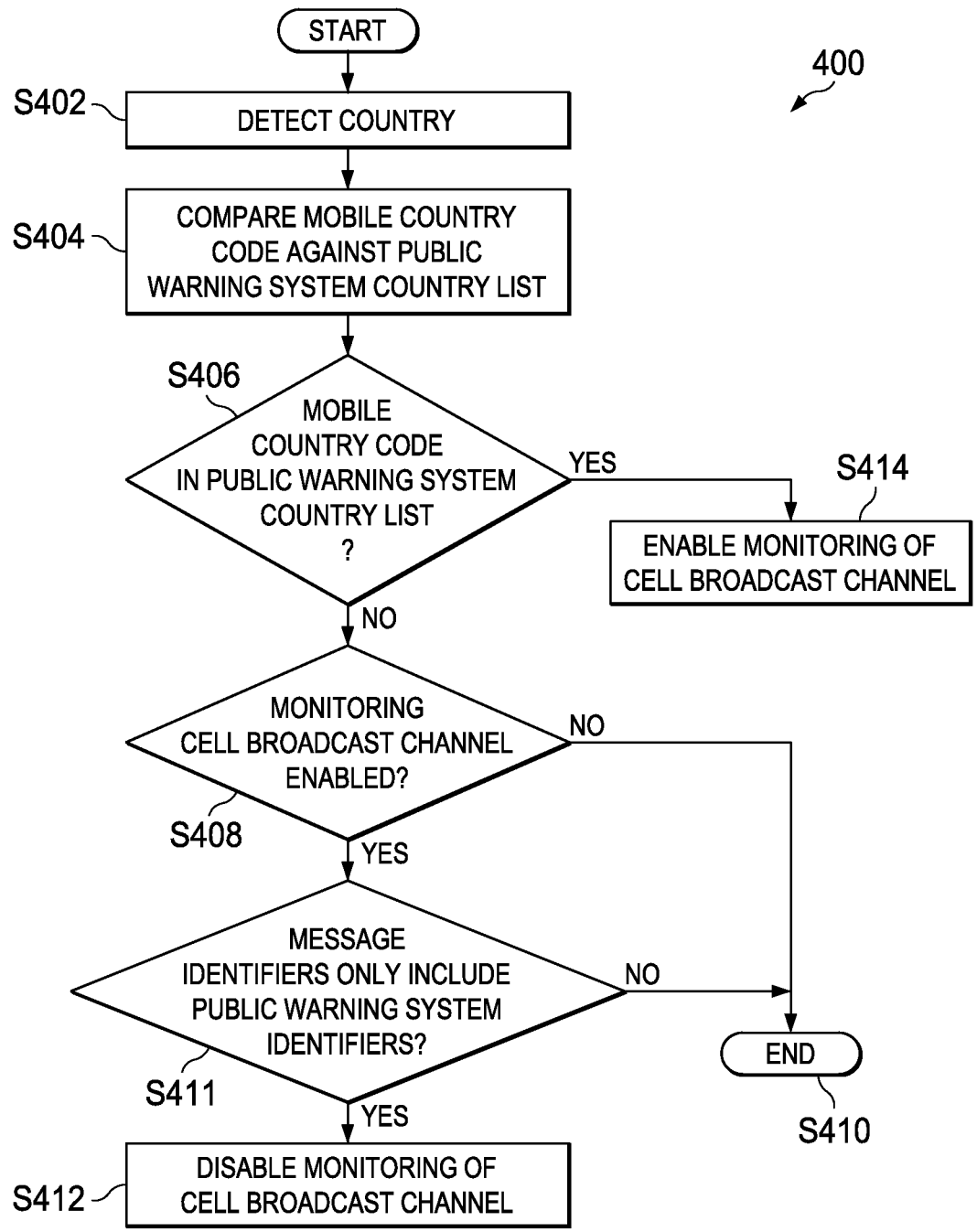
FIG. 4 shows a procedure of controlling the operation of a user equipment.

In accordance with embodiments of the present disclosure, the soft-modem code comprises code so as to implement the present disclosure. The steps are detailed below and illustrated in the flowchart 400 of FIG. 4.

At step S402, the modem 4 detects the country that the UE 102 is currently located in.

The first step S402 may be initiated when the UE 102 is first powered on; and/or when the modem 4 detects that the UE 102 has moved geographical location to a visited network which is provided by a foreign operator, from a geographical location with network coverage provided the UE's home network; and/or when the modem 4 detects that the UE 102 has moved geographical location between two visited networks each provided by different foreign operators.

Typically, the UE 102 will have access to a visited network which is provided by a foreign operator as a result of the UE's home network operator having one or more roaming agreements with network operators in foreign countries (countries other than the country of the UE's home network) which enable the UE 102 to use the foreign operator's network.

The modem 4 is able to detect the country that the UE 102 is currently located in by receiving a MCC from the radio access network 105 that the modem 4 is able to connect to. For example, the MCC may be broadcast by the radio access network 105 in a Master Information Block (MIB). As is known by persons skilled in the art, the modem 4 will typically be able to detect the MCC once a registration procedure succeeds or if a network scan has been successfully completed.

Following step S402, the modem 4 is arranged to determine if the detected country is a country in which a PWS is installed and activated.

For example, at step S404, the processor 33 may compare the MCC received from the radio access network 105 that the modem 4 is connected to, to the one or more MMCs in the PWS country list 37 stored in memory 34.

Based on this comparison at step S404, at step S406 the processor 33 is able to determine if the MCC received from the radio access network 105 that the modem 4 is connected to, is in the PWS country list 37.

If the processor 33 determines that the detected country is not a country in which a PWS is installed and activated, i.e., it is determined at step S406 that the MCC received from the radio access network 105 that the modem 4 is connected to, is not in the PWS country list 37, the process proceeds to step S408.

At step S408, the processor 33 determines if monitoring of the CB channel is enabled such that the CB channel can be periodically monitored by the modem 4 to check for CB messages received from the radio access network 105. When monitoring of the CB channel is enabled, the modem 4 will periodically monitor the CB channel for CB messages associated with the message identifiers stored in the configurable search list 38.

The process of a modem 4 monitoring a channel used for CB messages is well known to persons skilled in the art and is therefore not discussed herein in detail. Taking UMTS as an example, the modem 4 may monitor the S-CCPCH for FACH transmissions transporting a CB message on the CTCH logical channel.

If the processor 33 determines, at step S408, that monitoring of the CB channel is not enabled (i.e., the CB channel is not periodically monitored by the modem 4 to check for CB messages received from the radio access network 105), then the UE 102 is already in a state where power consumption is reduced (conserve power) by not monitoring the CB channel, and the process ends at step S410.

If the processor 33 determines, at step S408, that monitoring of the CB channel is enabled, the process proceeds to step S411.

At step S411, the processor 33 determines whether the configurable search list 38 includes only PWS message identifiers. If the configurable search list 38 includes one or more CB message identifier not associated with a PWS message then the process proceeds to step S410, wherein the modem 4 monitors the CB channel for non-PWS CB messages from the radio access network 105. If the configurable search list 38 includes only PWS message identifiers then the UE 102 is in a state where power will unnecessarily be consumed by the modem monitoring the CB channel, and the process proceeds to step S412.

At step S412, the processor 33 disables the monitoring of the CB channel, such that the periodical monitoring of the CB channel is stopped. This step is implemented because the UE 102 is located in a country that does not have a PWS installed and activated and thus the radio access network 105 will not be transmitting PWS messages to the UE 102 on the CB channel.

Referring back to step S406, if it is determined that the MCC received from the radio access network 105 that the UE 102 is connected to, is in the PWS country list 37, this indicates to the UE 102 that it is located in a country where a PWS is installed and activated, and the process proceeds to step S414.

At step S414, the processor 33 enables monitoring of the CB Channel. It will be appreciated that if the configurable search list 38 includes only PWS message identifiers, then whilst monitoring of the CB channel is enabled, the CB channel will only be monitored by the modem 4 if the configurable search list 38 includes PWS message identifier (s) associated with country detected at step S402. It will be also be appreciated that if the configurable search list 38 includes one or more non-PWS message identifier, then whilst monitoring of the CB channel is enabled the modem will monitor the CB channel for receiving messages associated with the one or more non-PWS message identifier.

Embodiments of the present disclosure advantageously enable a device to reduce power consumption (conserve power) when the device is located in a country where a public warning message is not expected and message identifiers stored in the configurable search list 38 only include PWS message identifiers by not listening (i.e., periodically monitoring) the CB channel.

It will be appreciated that the above embodiments have been described only by way of example. Other variants may become apparent to a person skilled in the art given the disclosure herein.

For example, whilst the disclosure has been described with reference to being applicable to a GSM, UMTS or LTE communication systems, the present disclosure can apply to other communication systems implemented in accordance with other radio access technologies. That is, while embodiments above have been described in relation to certain standards such as 3GPP networks, these are not intended to be limiting and the present disclosure may in fact be applied within any communication standard of any radio access network.

Further, although the above has been described in terms of a substantially soft modem implementation, other implementations where more or even all of the described functions are implemented in dedicated hardware are not excluded.

While this disclosure has been particularly shown and described with reference to some embodiments, it will be understood to those skilled in the art that various changes in form and detail may be made without departing from the scope of the disclosure as defined by the appendant claims.

Those skilled in the art to which this application relates will appreciate that other and further additions, deletions, substitutions and modifications may be made to the described embodiments.

What is claimed is:

1. A method of operating a modem at a terminal, the modem arranged to store one or more message identifier, each of the one or more message identifier identifying a type of message that the modem is arranged to act upon when received on a broadcast channel from a communications network, the method comprising:
    detecting a country that the terminal is located in;
    determining if the detected country is a country in which a public warning system is implemented;

determining if said one or more message identifier include only public warning message identifiers; and disabling monitoring of the broadcast channel, without user intervention, if the detected country is not a country in which a public warning system is implemented and said one or more message identifier includes only public warning message identifiers.

2. The method of claim 1, wherein said determining if the detected country is a country in which a public warning system is implemented comprises:

comparing the detected country to a list comprising one or more countries in which a public warning system is implemented.

3. The method of claim 2, wherein said detecting comprises receiving a mobile country code from said communications network, and said list comprises one or more mobile country code associated with one or more countries in which a public warning system is implemented, and said comparing comprises comparing the received mobile country code to the list comprising the one or more mobile country code.

4. The method of claim 3, wherein said list is updateable.

5. The method of claim 4, wherein said list is dynamically updated in response to the modem receiving data from the communications network.

6. The method of claim 1, wherein if said detected country is a country in which a public warning system is implemented, the method comprising:

determining if the monitoring of the broadcast channel is disabled, and if the monitoring is disabled, enabling monitoring of the broadcast channel.

7. The method of claim 6, wherein if the said one or more message identifiers include one or more public warning message identifier associated with the detected country, the method comprising:

monitoring said broadcast channel for receipt of one or more public warning message.

8. The method of claim 6, wherein the modem communicates with the communications network in accordance with a multi-layered communication protocol, and enabling the monitoring of the broadcast channel implemented by an application layer.

9. A modem for use at a terminal, the modem comprising:

a first interface arranged to connect to a communications network;

a memory arranged to store one or more message identifier, each of the one or more message identifier identifying a type of message that the modem is arranged to act upon when received on a broadcast channel from the communications network via the first interface; and a processing unit, the processing unit arranged to:
detect a country that the terminal is located in;
determine if the detected country is a country in which a public warning system is implemented;
determine if said one or more message identifier stored in memory include only public warning message identifiers; and
disable monitoring of the broadcast channel, without user intervention, if the detected country is not a country in which a public warning system is implemented and said one or more message identifier include only public warning message identifiers.

10. The modem of claim 9, wherein the processing unit is further arranged to determine if the detected country is a country in which a public warning system is implemented by comparing the detected country to a list comprising one or more countries in which a public warning system is implemented.

11. The modem of claim 10, wherein the processing unit is arranged to detect the country that the terminal is located in by receiving a mobile country code from said communications network via said first interface, and said list comprises one or more mobile country code associated with one or more countries in which a public warning system is implemented, and the processing unit is arranged to compare the received mobile country code to said list to determine if the detected country is a country in which a public warning system is implemented.

12. The modem of claim 10, wherein said list is updateable.

13. The modem of claim 12, wherein the processing unit is arranged to dynamically update said list in response to receiving data from the communications network via the first interface.

14. The modem of claim 9, wherein if said detected country is a country in which a public warning system is implemented, the processing unit further arranged to determine if the monitoring of the broadcast channel is disabled, and if the monitoring is disabled, enable monitoring of the broadcast channel.

15. The modem of claim 14, wherein if the said one or more message identifier include one or more public warning message identifier associated with the detected country, the processing unit further arranged to monitor said broadcast channel for receipt of one or more public warning message.

16. The modem of claim 9, wherein the terminal comprises a housing and the modem is an internal module within said terminal housing.

17. The modem of claim 16, wherein the modem comprises a second interface arranged to connect to a host processor on the terminal, the second interface comprising a wired connector or connection within said terminal housing to connect to the host processor.

18. The modem of claim 16, wherein the first interface connects to a first wireless transceiver of said terminal for connecting to the network.

19. The modem of claim 9, wherein the modem comprises an external unit for use at the terminal.

20. The modem of claim 19, wherein the modem comprises a second interface arranged to connect to a host processor on the terminal.

21. The modem of claim 20, wherein the second interface is a serial interface.

22. The modem of claim 20, wherein the modem comprises a dongle housing, said modem for plugging into said terminal via the second interface.

23. The modem of claim 20, wherein the first interface comprises a first wireless transceiver for connecting to the network.

24. The modem of claim 20, wherein the second interface comprises a second wireless transceiver for connecting to the terminal via a local wireless connection.

25. The modem of claim 20, wherein the modem comprises a mobile phone housing for connecting to said terminal via the second interface, the mobile phone thus being operable as a telephone and as an external wireless cellular modem for the terminal.

26. A computer program product for operating a modem for use at a terminal, wherein the computer program product comprises code embodied on a non-transitory computer-readable medium and configured so as when executed on a processing unit of said modem to perform the steps of:

storing one or more message identifier, each of the one or more message identifier identifying a type of message that the modem is arranged to act upon when received on a broadcast channel from a communications network;

detecting a country that the terminal is located in;

determining if the detected country is a country in which a public warning system is implemented;

determining if said one or more message identifier include only public warning message identifiers; and disabling monitoring of the broadcast channel, without user intervention, if the detected country is not a country in which a public warning system is implemented and said one or more message identifier includes only public warning message identifiers.

* * * * *